(12) United States Patent
Linker et al.

(10) Patent No.: US 7,574,675 B1
(45) Date of Patent: Aug. 11, 2009

(54) METHODS AND APPARATUS TO DISPLAY CONTENT SELECTIONS

(75) Inventors: Bruce A. Linker, Sammamish, WA (US); Jeffrey D. Argast, Lafayette, CO (US)

(73) Assignee: Adobe Systems Incorporated, San Jose, CA (US)

( * ) Notice: Subject to any disclaimer, the term of this patent is extended or adjusted under 35 U.S.C. 154(b) by 574 days.

(21) Appl. No.: 11/152,389

(22) Filed: Jun. 14, 2005

(51) Int. Cl.
 *G06F 3/048* (2006.01)
(52) U.S. Cl. .................. 715/841; 715/767; 715/805; 715/837; 715/860
(58) Field of Classification Search .......... 715/841, 715/764, 767, 860, 805, 837
 See application file for complete search history.

(56) References Cited

U.S. PATENT DOCUMENTS

| 5,446,838 | A | * | 8/1995 | Kimelman | 715/764 |
| 5,742,777 | A | * | 4/1998 | Eick | 715/787 |
| 6,202,064 | B1 | * | 3/2001 | Julliard | 707/5 |
| 7,036,078 | B1 | * | 4/2006 | Michail et al. | 715/202 |
| 2004/0205631 | A1 | * | 10/2004 | Keohane et al. | 715/526 |
| 2004/0261023 | A1 | * | 12/2004 | Bier | 715/530 |
| 2004/0261059 | A1 | * | 12/2004 | Spencer et al. | 717/120 |
| 2005/0114765 | A1 | * | 5/2005 | Gudenkauf et al. | 715/523 |
| 2005/0144571 | A1 | * | 6/2005 | Loverin et al. | 715/822 |
| 2005/0154994 | A1 | * | 7/2005 | Chen et al. | 715/770 |
| 2005/0193325 | A1 | * | 9/2005 | Epstein | 715/512 |
| 2007/0118794 | A1 | * | 5/2007 | Hollander et al. | 715/512 |

* cited by examiner

*Primary Examiner*—Ba Huynh
*Assistant Examiner*—Nicholas Augustine
(74) *Attorney, Agent, or Firm*—Chapin IP Law, LLC; Barry W. Chapin, Esq.

(57) ABSTRACT

An editor application highlights a user's original selection of text. The editor application additionally identifies whether the user's selection of text includes a portion of tagged content. If so, the editor application provides a visual indication of a remainder portion of the tagged content that is not included as part of the user's selection of text. That is, the editor application provides a first visual indication (e.g., a first color of highlighting) of the original text selected by the user and a second visual indication (e.g., a second color of highlighting) of a portion of the tagged content displayed outside of originally selected text. Consequently, the user can easily identify a first region of text originally selected by the user as well as a remainder portion of the tagged content in a second region exclusive with respect to the originally selected text.

30 Claims, 8 Drawing Sheets

METHODS AND APPARATUS TO DISPLAY CONTENT SELECTIONS

BACKGROUND

Use of text editors has become quite common in conventional computer applications. One reason for such a broad acceptance of text editors is the convenience afforded by their use. For example, via use of a window-based application such as a text editor, a computer user can open a "window" on a computer screen and modify the contents of a file such as a text-based document displayed in a respective window. Typically, text editors enable a user to select text in a document and thereafter apply text editing or formatting commands such as bolding, italicizing, underlining, sizing of text. One way of initiating commands on selected text in a document is to select a command from a pull-down menu to be applied to the selected text.

In addition to standard text editors that enable editing of purely text-based documents, conventional editors have evolved to enable a user to edit other types of documents as well. For example, conventional XML (Extensible Markup Language) editors have been developed to enable a user to view and modify contents of an XML-based document.

In general, XML is a powerful language for formatting web information. HTML (Hyper Text Markup Language) is also a language enabling a user to create web pages based on use of predefined tags that indicate how text appears in a web page. However, XML is more powerful than HTML because XML allows users to define their own tags. The tags in XML enable definition, transmission, validation, and interpretation of data between applications and organizations. Consequently, via use of tags, data can be structured according to formal criteria (such as header, body, text, etc.) as well as by referring to its content. In other words, a tag is a command inserted in the document identifying how a portion of the document will be formatted when later displayed in a browser page.

SUMMARY

Conventional editors that enable editing of XML-type documents suffer from a number of deficiencies. For example, one type of conventional XML-based editor enables a user to manage, modify, and apply tag commands to tagged content in an XML-type document. Additionally, such a conventional editor enables the user to apply text-formatting commands to selected text in the XML-type document. Based on use of conventional XML-based editors, it can be confusing regarding what commands a user can apply to different portions of selected or displayed text. For instance, if a user selects a range of text in an XML-type document and decides to delete the selected text, the user may accidentally delete corresponding tagged content because the selected text may include a portion of a tagged content unbeknownst to the user.

One type of conventional XML editor addresses this problem by constraining a user's selection of text. For example, in certain cases, if a user makes a text selection and crosses a boundary associated with tagged content (e.g., a tag element), then the most subordinate of the two adjacent elements will be selected in its entirety. If the elements are siblings with respect to each other, then both elements will be selected in their entirety. This makes it easy for the user to know what will happen when tag operations are invoked on selected text. Unfortunately, this conventional technique of constraining text selection is unacceptable for a user who simply wants to select and format text including only a portion of tagged content. For example, a user may be interested in formatting selected text without applying changes to existing portions of tagged content that happen to be part of the selected text.

Techniques discussed herein deviate with respect to conventional applications such as those discussed above as well as additional techniques also known in the prior art. In particular, embodiments herein enable a user to select text in a document (e.g., an XML-type document) displayed in an application such as an editor and more easily apply different types of commands to different highlighted regions of displayed content.

For example, a technique as further described herein involves an editor application that highlights a user's original selection of text. In addition to highlighting the user's original selection of text, the editor application according to an embodiment herein identifies whether the user's selection of text includes a portion of tagged content. If so, the editor application herein provides a visual indication of a remainder portion of the tagged content that is not included as part of the user's selection text. In other words, the editor application provides a first visual indication (e.g., a first color of highlighting) of the original text selected by the user and a second visual indication (e.g., a second color of highlighting) of a portion of the tagged content displayed outside of the originally selected region of text. Consequently, the user can easily identify a first region of text originally selected by the user as well as a remainder portion of the tagged content in a second region exclusive with respect to the originally selected text.

More particularly, according to one configuration, an editor application (e.g., a windows-based application) according to an embodiment herein identifies a selection of content (e.g., text) based on monitoring movement of a pointer in a document displayed in a viewing region of a display screen. For a selection of content such as text, the editor application generates a first visual indication (e.g., a first type of background shading) to indicate an original selection of content by a user.

In this example, assume that the selection of content or text includes a portion of tagged content (e.g., a grouping of related content or text). The editor application according to an embodiment herein detects that the selection of content includes only a portion of the tagged content. One way to identify whether the selection of text includes a portion of tagged content involves checking whether the selection of content includes selection of a marker representing a corresponding boundary associated with the tagged content. In one embodiment, the tagged content includes a beginning and end marker to a respective beginning and end of the tagged content (e.g., a group of text). Accordingly, inclusion of either the beginning marker or end marker in the selection of text indicates that at least a portion of but not all of the tagged content resides within the selection of content. Inclusion of both the beginning marker and end marker associated with a given set of tagged content in the selection of text would indicate that the whole set of tagged content resides within an original selection of text.

When processing the user's selection of content, assume that the editor application detects that the selection of content includes selection of a first marker associated with a first boundary (e.g., a beginning boundary) of the grouping of related content. In other words, the editor application according to an embodiment herein detects that at least a portion of the selected content has a boundary associated with it. As discussed, inclusion of a first marker in the selection of content indicates that at least a portion of the tagged content resides within the selection of content.

In this example, the editor application according to an embodiment herein further detects that the selection of content does not include selection of a second marker (e.g., an end marker) associated with the grouping of related content. As discussed, the second marker represents a second boundary associated with the grouping of related content. The editor application therefore assumes that exclusion of the second marker from the selection of content indicates that an entirety of the tagged content does not reside within the selection of content. In other words, the editor application identifies that only a portion of the tagged content resides in the user's selection of content.

In response to detecting that the selection of content includes only a portion of the tagged content, the editor application generates a second visual indication (e.g., a second type of background shading) in a region exclusive of the first visual indication (e.g., a first type of background shading) to indicate a portion of the tagged content not included in the selection of content. Accordingly, a user viewing the display screen can identify an original selection of content such as content selected via use of a mouse controlled pointer as well as a remainder portion of tagged content not completely encompassed by a user's original selection of text.

Further functionality of the editor application discussed herein includes displaying one or more text editor commands enabling a user to perform one or more respective text editing functions associated with the selection of content identified by the first visual indication. The one or more text editing function enables a user to apply text formatting commands (e.g., bold, italicize, underline, etc.), copy/paste operations, etc. to selected text. Additionally, the editor application can display a list of one or more tag commands enabling the user to perform one or more respective tag operation on the tagged content at least partially encompassed by the original selection of text. The one or more respective tag operation enables the user to select which modification functions (e.g., create a new tag element, change a tag name, remove tags, move elements, etc.) to execute on the tagged content. Thus, the editor application according to an embodiment herein provides dual purpose editing. For example, the editor application can provide (e.g., via a pull-down menu) a display of text editor commands that can be performed on the original selection of content identified by the first visual indication, and tag commands that can be performed on the tagged content. In further embodiments, the editor application can be applied to the original selection of content as identified by the first visual indication as well as an at least partially selected tag commands. For example, the editor application herein can support "copying" of both the unstructured selected content (e.g., text) and the structured selected content (e.g., a portion of selected tagged content) to a clipboard in different formats (e.g., as plain text string as well as portions of XML tags respectively).

Other embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for displaying selected content. The instructions, when carried out by a processor of a respective computer device, cause the processor to perform the steps of: i) providing a first visual indication to indicate a selection of content; ii) detecting that the selection of content includes part of a grouping of related content; and iii) providing a second visual indication in a region exclusive of the first visual indication to indicate a portion of the grouping of related content not included in the selection of content. Other embodiments of the present application include software programs to perform any of the method embodiment steps and operations summarized above and disclosed in detail below.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

As discussed above, techniques herein are well suited for use in computer systems that display windows for displaying content, images, text, etc. However, it should be noted that embodiments of the present application are not limited to use in such applications and that the techniques discussed herein are well suited for other applications as well. For example, techniques herein can be used to highlight other types of related content in addition to content such as XML tags. More specifically, highlighting techniques as discussed herein can be applied to any type of content groupings including boundaries such as sentence/paragraphs, quoted text, content enclosed in parenthesis, etc. Additional features of the present application will be further discussed via the Detailed Description section of this application as well as accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, an editor application highlights a user's selection of text. The editor application identifies whether the user's selection of text includes a portion of tagged content. If so, the editor application provides a visual indication of a remainder portion of the tagged content that is not included as part of the user's selection of text. For example, the editor application provides a first visual indication (e.g., a first color of highlighting or shading) of the original text selected by the user and a second visual indication (e.g., a second color of highlighting or shading) of a portion of the tagged content displayed outside a region of the of originally selected text. Consequently, the user can easily identify a first region of text originally selected by the user as well as a remainder portion of respective tagged content in a second region exclusive with respect to the originally selected text.

Figure 1:
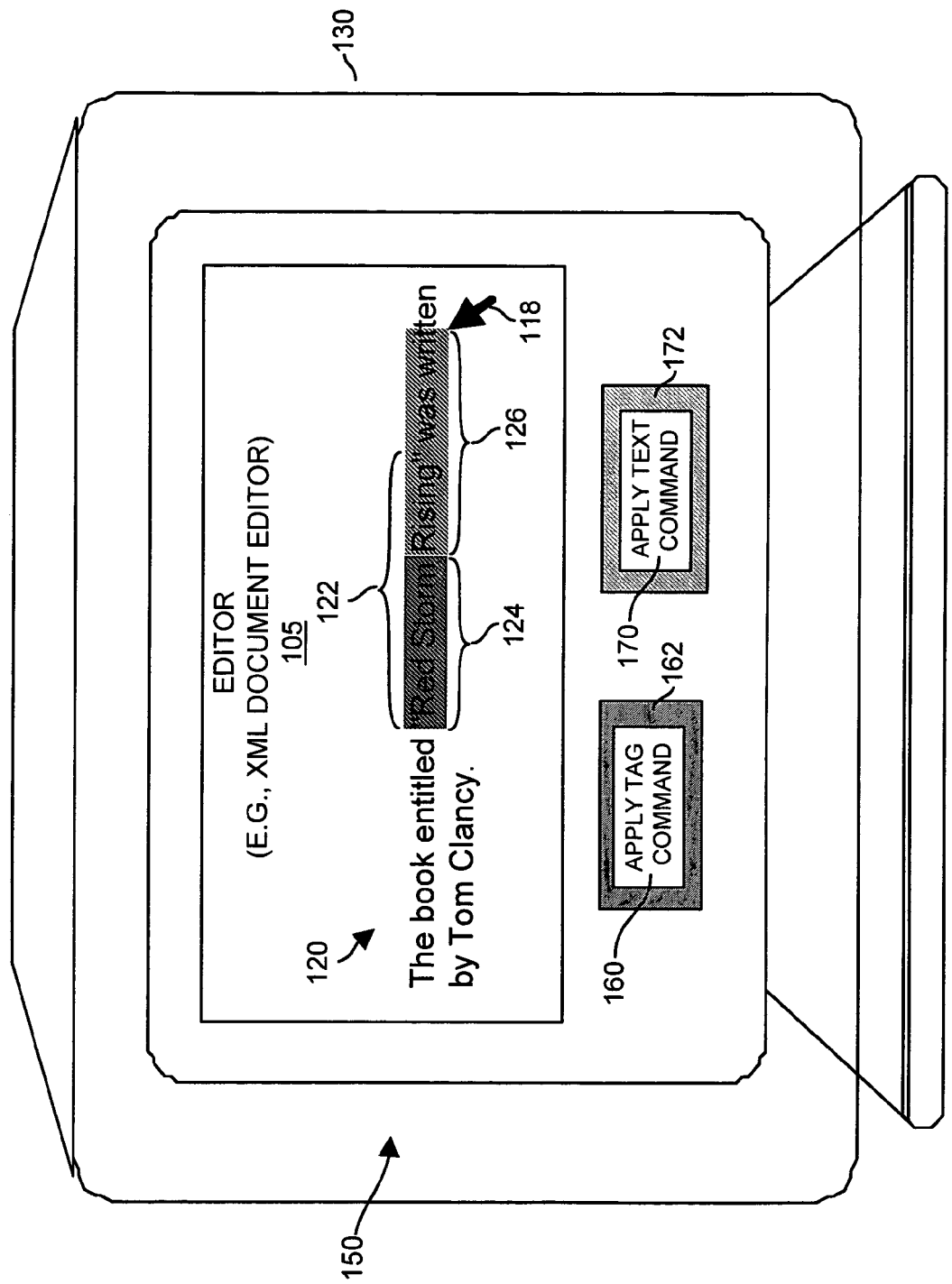
FIG. 1 is a diagram of a display environment for displaying an editor application according to an embodiment herein.

FIG. 1 is a diagram illustrating a display environment 100 according to an embodiment herein. As shown, display screen 130 includes a graphical user interface 150 displaying editor 105 such as an XML document editor. Editor 105 displays content 120 (e.g., text, tagged items, etc.) of a corresponding document (e.g., an XML-based document including tagged content) being edited by a respective user or other entity viewing display screen 130. Note that use of editor 105 is by way of example only and that techniques herein apply to any type of application in which a user selects partial groups of content for applying commands. For example, the techniques herein can be applied to any type of application including groups of related content marked by boundaries (such as paragraphs/sentences, content in quotes, content in parenthesis, etc.) in which a user may select only a portion of a group of related content.

In the context as shown in FIG. 1, editor 105 enables a user modifying a respective document presented on display screen 130 to select portions of content 120 via pointer 118. As shown, a user sweeps across a portion of content 120 with pointer 118 to select content 126. Editor 105 provides a visual indication such as highlighting, shading, coloring, etc. of text or background to provide a first type of visual cue (e.g., a first type of shading) to indicate that content 126 has been selected by a user. If the selected content 126 includes a portion of tagged content, then editor 105 provides a second type of visual cue (e.g., a second type of shading) to indicate that tagged content 122 has been at least partially selected by the user.

According to one embodiment, text such as tagged content 122 (e.g., "Red Storm Rising") includes respective markers to indicate starting and ending boundaries associated with the tagged content 122. Such tags may be visible to the user or invisible to the user viewing display screen 130 depending on a viewing mode of editor 105. When the markers are invisible as in the present example, editor 105 is especially useful in displaying where a tag begins or ends as well as possibly both the beginning and end boundaries of a string of text comprising respective tagged content. For example, editor 105 provides a visual indication (e.g., shading of content 124) in response to detecting movement of pointer 118 in relation to one of: i) a starting boundary associated with tagged content 122, and ii) an ending boundary associated with tagged content 122. In the present example, as shown, editor 105 detects that selected content 126 includes at least a portion of tagged content 122 based on inclusion of an "invisible" marker associated with the end of tagged content 122.

According to the embodiment as shown, editor 105 can display commands (e.g., apply tag command 160 and apply text command 170) that can be applied to respective portions of highlighted portions of content 120. For example, a user can select apply tag command 160 on display screen 130 to apply one or more "tag-type" of commands (e.g., create new tag, change tag name, delete tag, etc.) to tagged content 122. A user can select apply text command 170 on display screen 130 to apply one or more "text-type" commands (e.g., bold text, underline text, delete text, etc.) to selection of content 126.

Apply tag command 160 in display region 162 as well as apply text command 170 in display region 172 can be embodied as respective pull-down menus in which a user can select (e.g., such as right click on) a respective command in a pull-down-menu of optional commands that can be applied to specific highlighted regions of content 120.

Note that selectable icons (e.g., embodied as apply tag command 160 and apply text command 170) associated with editor 105 can include a visual indication to indicate which commands apply to highlighted content. For example, editor 105 can generate display region 162 to have a same shading, color, etc. as content 124 to identify that apply tag command 160 can be selected to execute a command with respect to tagged content 122 or content 124. Editor 105 also can generate display region 172 to have a same shading, color, etc. as selection of content 126 to identify that apply text command 170 can be selected to execute a command with respect to selection of content 126. This technique of providing a legend can be achieved in other ways such as by providing a visual indication in a pull-down menu identifying which of multiple commands can be applied to corresponding regions of content.

According to another configuration, there is no need to continuously display apply tag command 160 and apply text command 170 on display screen 130. For example, in lieu of the above embodiment, the user can right click a mouse when pointer 118 is positioned over a shaded region of content (e.g., content 124 or selection of content 126) in order to cause a respective pull-down menu to be displayed on display screen 130. When a user right clicks a mouse while pointer 118 is positioned over content 124, the resulting pull-down menu displays tag commands that can be applied to tagged content 122. In a similar vein, when a user rights clicks a mouse while pointer 118 is positioned over selection of content 126, the respective pull-down menu displays text commands that can be applied to selection of content 126. The commands can have an associated legend (e.g., coloring, shading, etc.) to identify which commands can be applied to the selected content (e.g., tags or text). The user can thereafter select a respective command to apply from a displayed pull-down menu. Accordingly, embodiments herein involve displaying a first type of command that can be performed on the selected content 126 as identified by a first visual indication (e.g., first type of shading) as well as displaying a second type of command that can be performed on tagged content 122 (e.g., a grouping of related content) as particularly identified by a second visual indication (e.g., a second type of shading).

The above-mentioned dual selection mode associated with editor 105 is a way of simultaneously displaying two different selections in display screen 130. For example, as discussed, one selection or highlighted region (e.g., selection of content 126) identifies text while the other highlighted region (e.g., content 124 such as a portion of tagged content 122) identifies content such as an XML element. When the user sweeps pointer 118 and selects a range of text, the editor 105 displays the user's selection of content via a first shaded background. When the selection of content 126 crosses an element boundary associated with tagged content 122, editor 105 displays another selection such as content 124 via a different type of shaded background so that a user viewing display screen 130 can differentiate between originally selected text and a respective portion (e.g., content 124) of tagged content 122 not completely selected by the user. Further embodiments herein enable a user to identify the entire portion of tagged content 122 as well as the selection of content 126.

As shown in editor 105 of FIG. 1, given the text: "The book entitled "Red Storm Rising" was written by Tom Clancy." assume that the title "Red Storm Rising" is tagged as an element. When a user starts a text selection via pointer 118 at the word "Rising" and extends the pointer 118 to the right (e.g., potentially shown as inverse selection with black background), eventually the pointer 118 crosses an element boundary at the end of the title. Editor 105 monitors (e.g., searched for boundary markers) the selection to detect the occurrence of pointer 118 crossing this invisible element boundary at the end of the title. After crossing the tagged element boundary and checking that the selected content does not include both a beginning and end boundary, editor 105 displays a visual indication (e.g., shading of region 124) to indicate to a viewer where the tagged content begins. As mentioned, type of shading can depend on the application.

As mentioned above, given the current selection of content 126, the user can invoke a formatting command on content 126 to change respective formatting of text in the text selection. Additionally, the user can invoke a tag command on content 122 to change a state of the element selection. Basically, anything having to do with text is invoked in the text selection and anything having to do with tags and elements is invoked using the element selection.

The following is a list of example commands that can be applied to content 126:

Text attributes (bold, italic, etc.)
Copy/Paste operations
Replace selection, i.e., typing will replace the selected text with the new text.
Any of the tag commands in the following list if the selection does not encompass at least one element. This would be the case if the entire selection was within one element or of the text has not been tagged at all.

The following is a list of example commands that can be applied to content 122:

Tagging (creating a new element)
Change tag name
Remove tags
Move element

Accordingly, this technique enables the user to visually understand what will happen in the text when using two different selection paradigms in one view. Conventional editors require that a user use two different editor modes—one to work with text and another to work with elements—perhaps using a separate tool. Based on the present technique, a user can apply commands to different types of content using the same viewing mode.

In an alternative embodiment, editor application 105 can provide three visual indicators rather than just two. For example, the visual indication for content 122 can be one color while the content 126 can be another color. By virtue of overlapping regions, of content 124 and content 126, editor application 105 produces a third color or third visual indication of the region of overlapping content. This solves the "edge" case problem where both the structured and unstructured selections are coincidental. Editor application 105 can use slightly transparent colors for each of the structured and unstructured selections such that the overlap automatically blends to a third color. In other words, editor application 105 highlights content 126 with a first transparent color and content 122 with a second color. Overlapping regions of content such as the word "Rising" appears as a third color formed by a combination of the first color and the second color.

If a user right clicks on a respective mouse when pointer 118 is within the overlapping region of content 124 and content 126, then editor application 105 displays a pull-down menu on display screen 130 listing the commands that can be applied to both the unstructured and structured selection (e.g., content 122).

Figure 2:
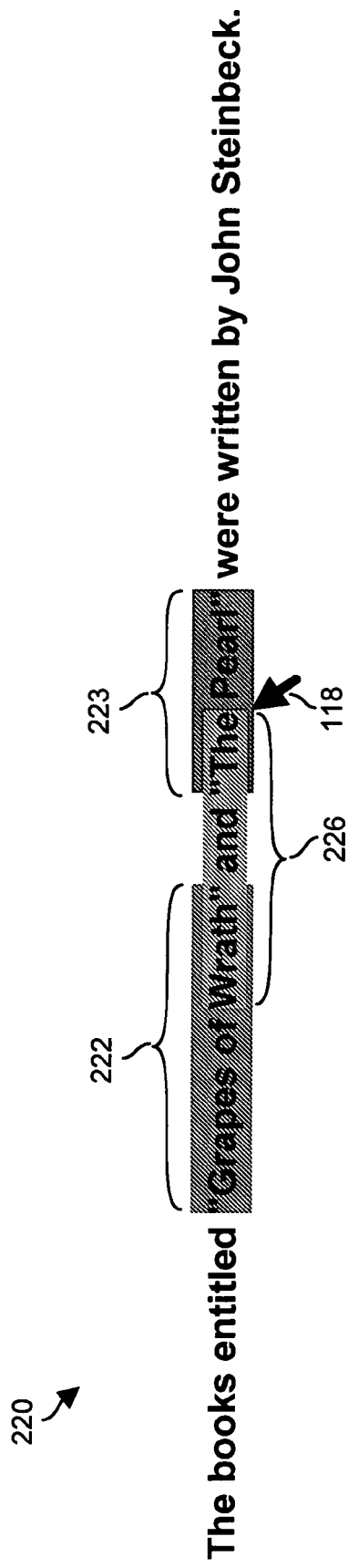
FIG. 2 is a diagram illustrating a selection of text and corresponding regions of tagged content according to an embodiment herein.

FIG. 2 is a diagram illustrating a selection of text 220 and corresponding regions of tagged content (e.g., tagged content 122 includes the title "Grapes of Wrath" and tagged content 223 includes the title "The Pearl") according to an embodiment herein. As shown, a user selects content 226. In response to this selection, editor 105 detects the inclusion of an end marker associated with tagged content 222 and inclusion of a beginning marker associated with tagged content 223. In response to the inclusion of respective markers associated with tagged content 222 and tagged content 223, editor 105 provides different shades of highlighting (e.g., visual indications) to illustrate text selected by a user as well as regions of tagged content at least partially included in the selected content 226. Different shadings or highlighting can be used to identify tagged content depending on whether tags reside at a same level of a hierarchy (e.g., siblings) or at different levels of a hierarchy (e.g., parent-child). For example, tagged content at a same level can be highlighted in a similar way, whereas tagged content at different levels of a hierarchy can be highlighted with different types of highlighting. Note in this example, highlighting of regions can overlap each other to show a user a whole region of tagged content rather than only a portion of respective tagged content.

The previous paragraph describes a discontinuous structured content selection. As an alternative to this embodiment, in order for content 222 and content 223 to be structured elements (e.g., tagged content), they must be children of some other element. For this discussion, assume that the parent element extends from "T" in "The book . . . " to the "k" in "Steinbeck." In this embodiment, further assume that a user starts the selection to the left of the letter "W" in the word "Wrath." When the pointer 118 crosses an element boundary after "Wrath," the structured selection would now show the parent element as also being selected.

Figure 3:
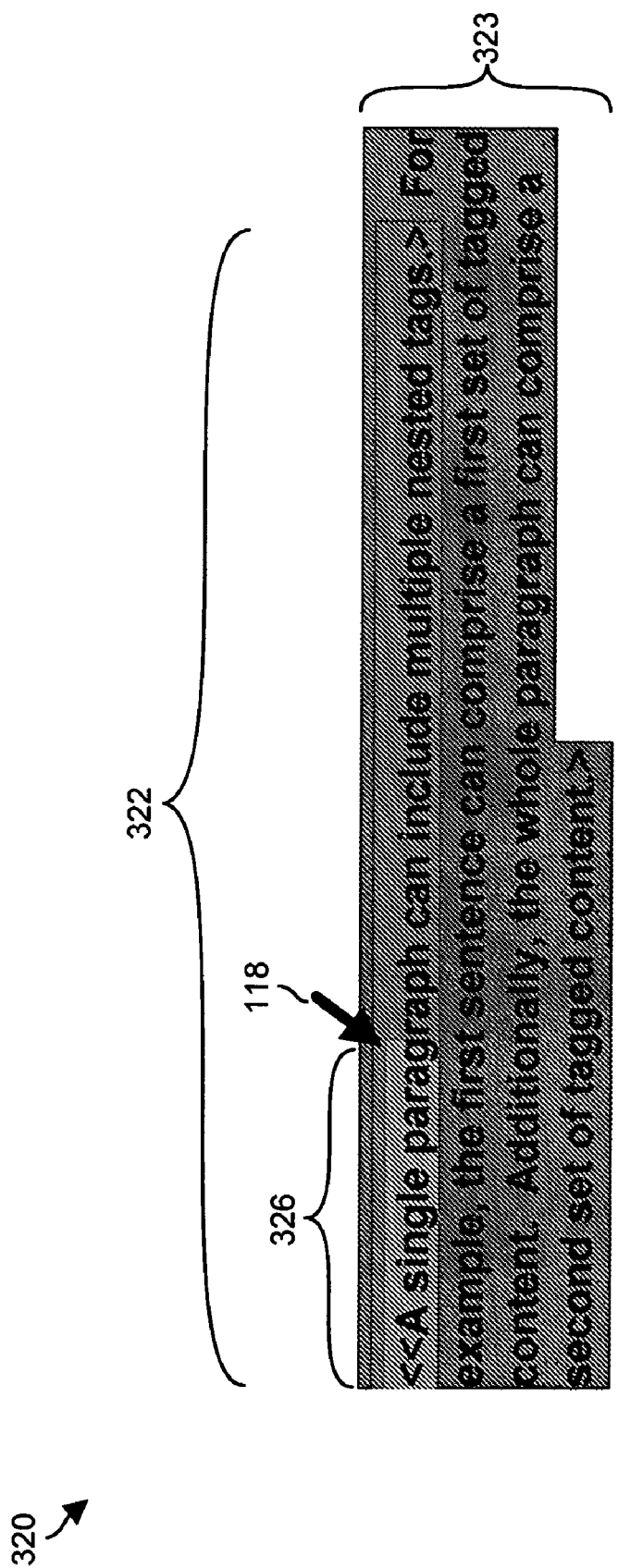
FIG. 3 is a diagram illustrating a selection of text and corresponding regions of tagged content according to an embodiment herein.

FIG. 3 is a diagram illustrating a selection of text and corresponding regions of tagged content according to an embodiment herein. In this example, content 320 includes nested sets of tagged content such as tagged content 322 and tagged content 323. As shown, user utilizes pointer 118 to select content 326 including "<<A single parag". The open brackets "<" and closed brackets ">" in content 320 represent boundary markers identifying respective beginning and ends of tagged content. For example, the second open bracket in "<<A single parag" represents a first boundary marker (e.g., beginning boundary marker) associated with tagged content 322. The first closed bracket after "... nested tags." represents a second boundary marker (e.g., end boundary marker) associated with tagged content 322. Note that brackets can be zero-width characters because they do not appear to a viewer displaying a respective document in a browser.

In a similar vein as discussed above for tagged content 322, the first open bracket in "<<A single parag" represents a first boundary marker (e.g., beginning boundary marker) associated with tagged content 323. The first closed bracket after "... set of tagged content." in content 320 represents a second boundary marker (e.g., end boundary marker) associated with tagged content 323. Thus, tagged content 322 is nested within tagged content 323.

After selection of content 326 via pointer 118, editor 105 identifies that selected content 326 has two associated open brackets. In response to detecting the two open brackets, editor 105 identifies corresponding end brackets and highlights respective tagged content 322 and tagged content 323 to differentiate such regions to a viewer editing a respective document. Consequently, a user editing content 320 in a respective document displayed by editor 105 can identify the different regions of content (e.g., selected content 326, tagged content 322, and tagged content 323) based on different visual indications.

In alternative embodiment associated with FIG. 3, editor application 105 would highlight tagged content 322 until the pointer crossed a tag boundary associated with content 322, at which, the editor application 105 would highlight tagged content 323. Editor application 105 would not separately highlight nested structures. Either tagged content 323 would be selected (and therefore implicitly content 322 would be selected because it is a child) or tagged content 322 would be selected.

Figure 4:
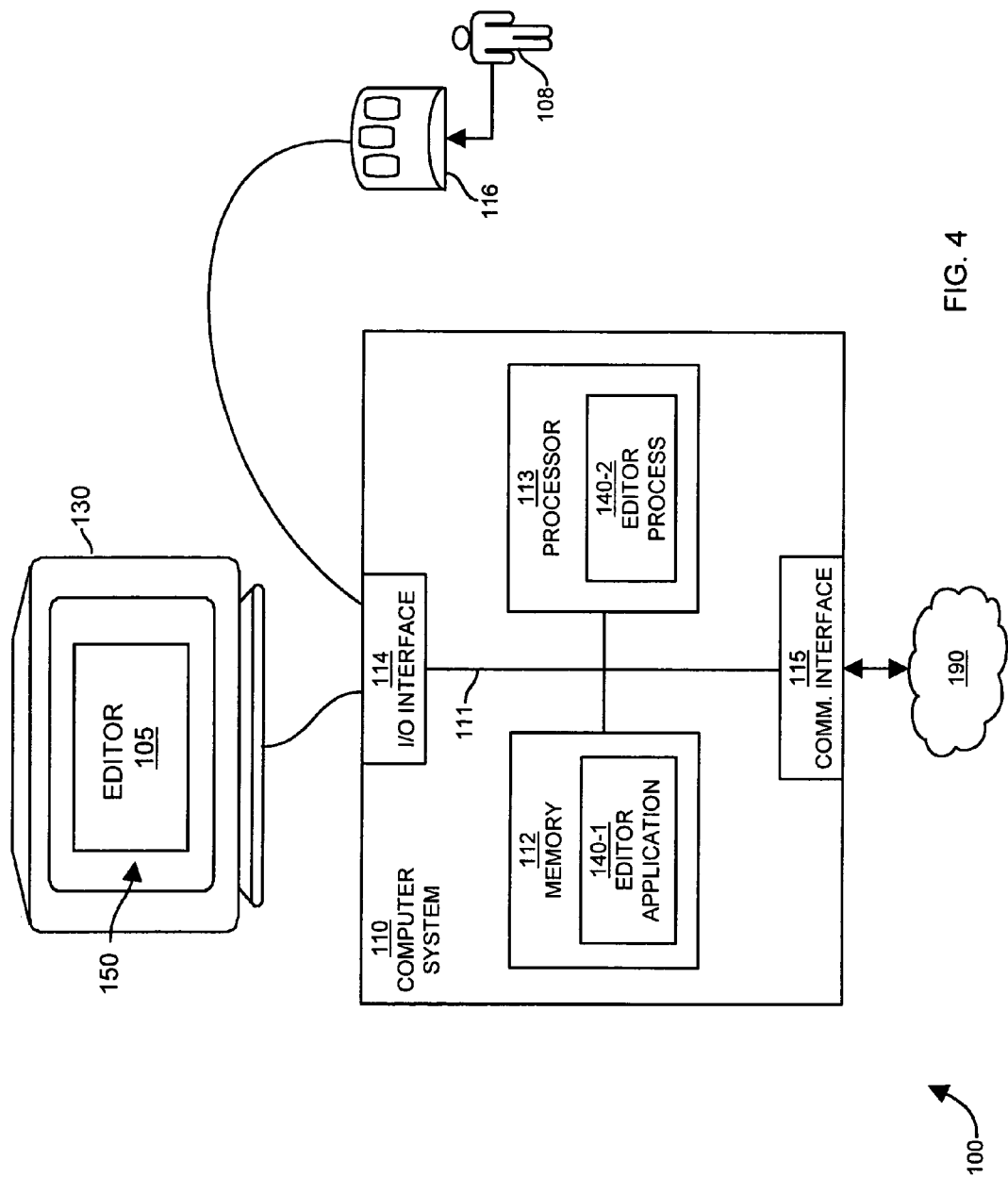
FIG. 4 is a block diagram of a processing device suitable for executing an editor application according to an embodiment herein

FIG. 4 is a block diagram illustrating an example architecture of a computer system 110 for executing editor application 140-1 according to embodiments herein. Computer system 110 can be a computerized device such as a personal computer, workstation, portable computing device, console, network terminal, processing device, etc. As shown, computer system 110 of the present example includes an interconnect 111 that couples a memory system 112, a processor 113, I/O interface 114, and a communications interface 115. I/O interface 114 potentially provides connectivity to peripheral devices such as a keyboard, mouse, display screens, etc.

Communications interface 115 enables computer system 110 to communicate over network 190 to retrieve and transmit information from remotely located sources if necessary.

As shown, memory system 112 is encoded with an editor application 140-1 (e.g., a graphical user interface application generating editor 105 as discussed in FIG. 1) supporting modification of documents such as XML-base documents. Editor application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the editor application 140-1. Execution of the editor application 140-1 produces processing functionality in editor process 140-2. In other words, the editor process 140-2 represents one or more portions of the editor application 140-1 (or the entire application) performing within or upon the processor 113 in the computer system 110.

It should be noted that editor 105 displayed on display screen 130 (as in FIG. 1) can be represented by either one or both of the editor application 140-1 and/or the editor process 140-2. For purposes of the following discussion, general reference will now be made to the computer system 110 or respective editor 105 as performing or supporting the various steps and functional operations in flowcharts of FIGS. 5-8 to carry out the features of embodiments herein.

It also should be noted that, in addition to the editor process 140-2, embodiments herein include the editor application 140-1 itself (i.e., the un-executed or non-performing logic instructions and/or data). The editor application 140-1 may be stored on a computer readable medium such as a floppy disk, hard disk or in an optical medium. The editor application 140-1 can also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of editor application 140-1 in processor 113 as the editor process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with editor 105 will now be discussed via flowcharts in FIGS. 5-8. For purposes of this discussion, computer system 110 or editor 105 (e.g., editor application 140-1 and/or editor process 140-2) generally performs steps in the flowcharts.

Note that there will be some overlap with respect to concepts discussed above for FIGS. 1-3. Also, note that the steps in the below flowcharts need not always be executed in the order shown.

Figure 5:
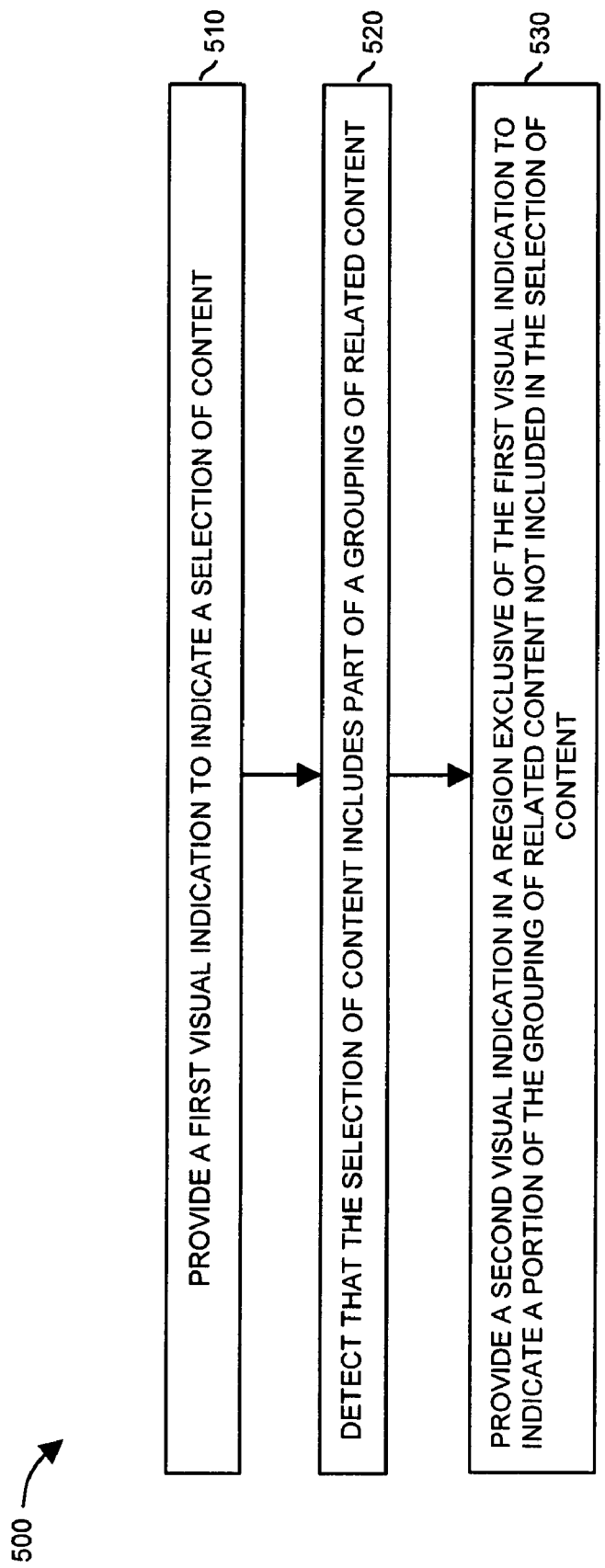
FIG. 5 is a flowchart illustrating techniques associated with an editor application according to an embodiment herein.

FIG. 5 is a flowchart 500 illustrating a technique of displaying information in editor 105 according to an embodiment herein. As discussed, one purpose of highlighting a selection of text as well as respective tagged content is to enable a user to identify when a selection of content includes a portion of tagged content.

In step 510, editor 105 provides (e.g., displays) a first visual indication to indicate a selection of content by user 108 or other entity.

In step 520, editor 105 detects that the selection of content includes part of a grouping of related content (e.g., tagged content).

In step 530, editor 105 provides a second visual indication in a region exclusive of the first visual indication to indicate a portion of the grouping of related content (e.g., tagged content) not included in the selection of content.

Figure 6:
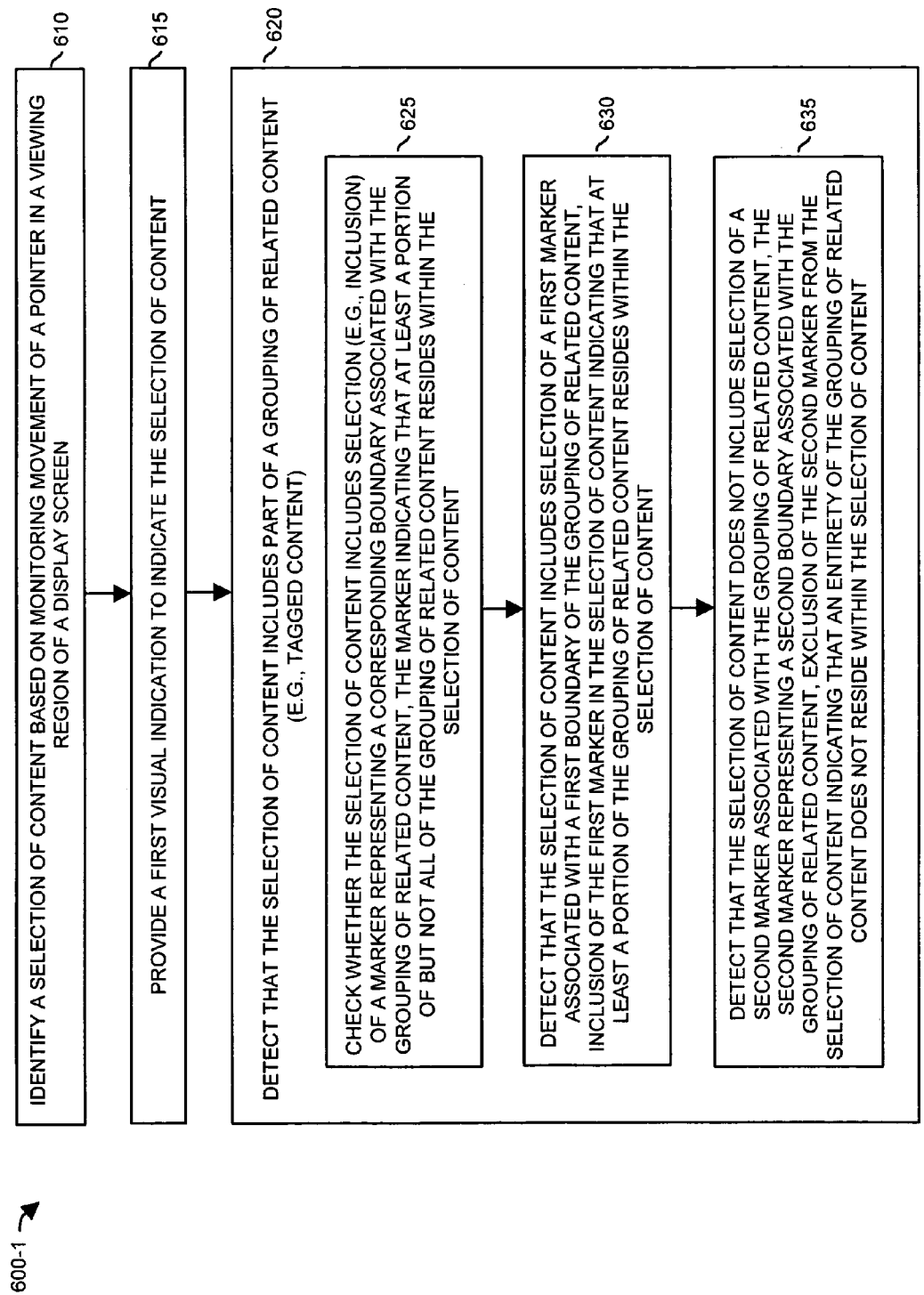
FIGS. 6 and 7 combine to form a flowchart illustrating techniques associated with an editor application according to an embodiment herein.
Figure 7:
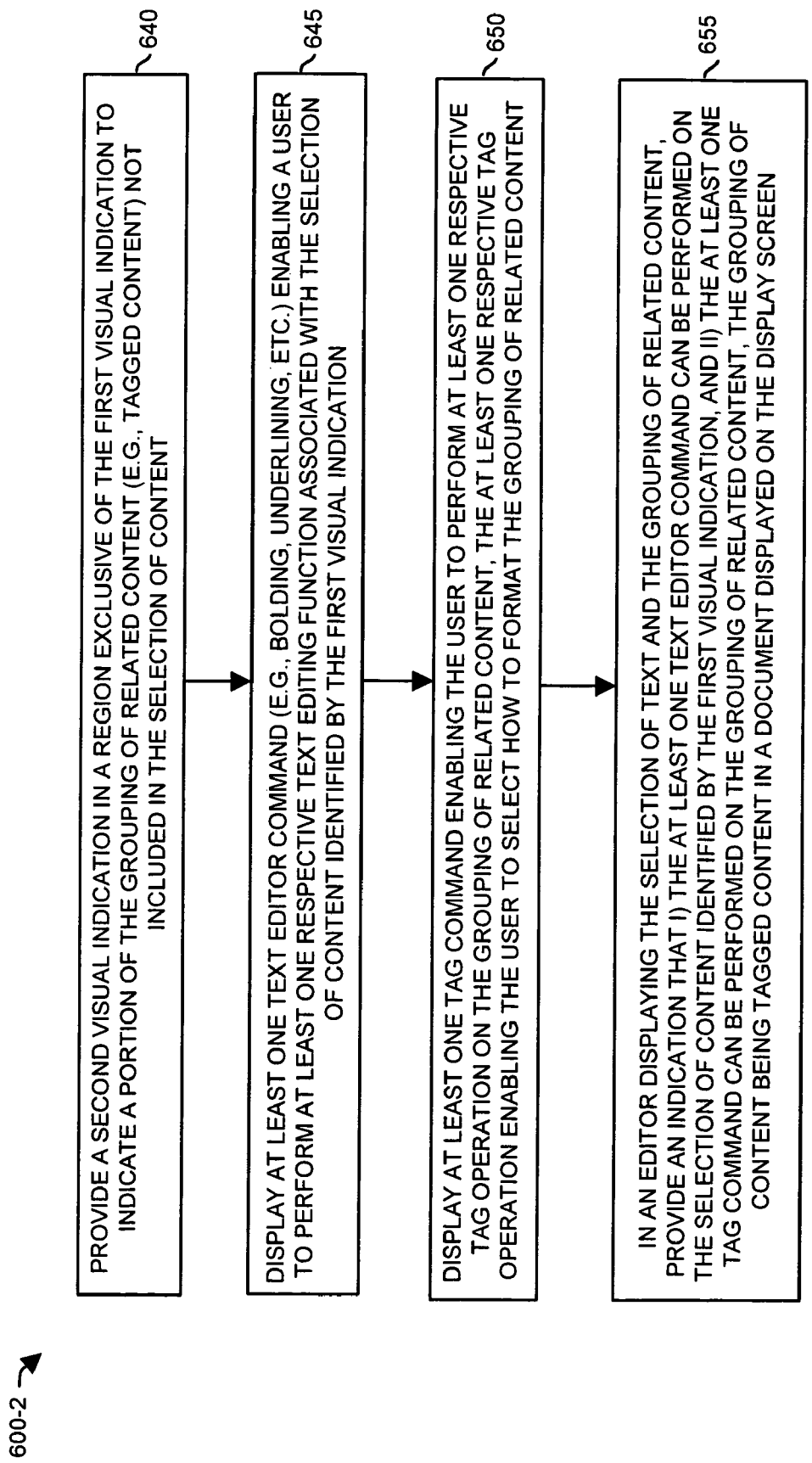

FIGS. 6 and 7 combine to form flowchart 600 (comprising flowchart 600-1 and flowchart 600-2) illustrating more specific techniques associated with embodiments herein.

In step 610, editor 105 identifies a selection of content based on monitoring movement of a pointer in a viewing region of a display screen 130.

In step 615, editor 105 provides a first visual indication on display screen 130 to indicate the selection of content.

In step 620, editor 105 detects that the selection of content includes part of but not all of a grouping of related content (e.g., tagged content). In one embodiment, editor 105 performs sub-step 625, sub-step 630, and sub-step 635 to carry out step 620.

In sub-step 625 of step 620, editor 105 checks whether the selection of content includes selection (e.g., inclusion) of a marker representing a corresponding boundary associated with the grouping of related content, the marker indicating that at least a portion of but not all of the grouping of related content resides within the selection of content.

In sub-step 630 of step 620, editor 105 detect that the selection of content includes selection of a first marker associated with a first boundary of the grouping of related content, inclusion of the first marker in the selection of content indicating that at least a portion of the grouping of related content resides within the selection of content.

In sub-step 635 of step 620, editor 105 detect that the selection of content does not include selection of a second marker associated with the grouping of related content, the second marker representing a second boundary associated with the grouping of related content, exclusion of the second marker from the selection of content indicating that an entirety of the grouping of related content does not reside within the selection of content.

In step 640, editor 105 provides a second visual indication in a region exclusive of the first visual indication to indicate a portion of the grouping of related content not included in the selection of content.

In step 645, editor 105 displays at least one text editor command (e.g., bolding, underlining, etc.) enabling a user to perform at least one respective text editing function associated with the selection of content identified by the first visual indication.

In step 650, editor 105 displays at least one tag command enabling the user to perform at least one respective tag operation on the grouping of related content, the at least one respective tag operation enabling the user to select how to format the grouping of related content.

In step 655, editor 105 provides an indication (in the displayed selection of text and grouping of related content) that i) the at least one text editor command can be performed on the selection of content identified by the first visual indication, and ii) the at least one tag command can be performed on the grouping of related content, the grouping of content being tagged content in a document displayed on the display screen.

Figure 8:
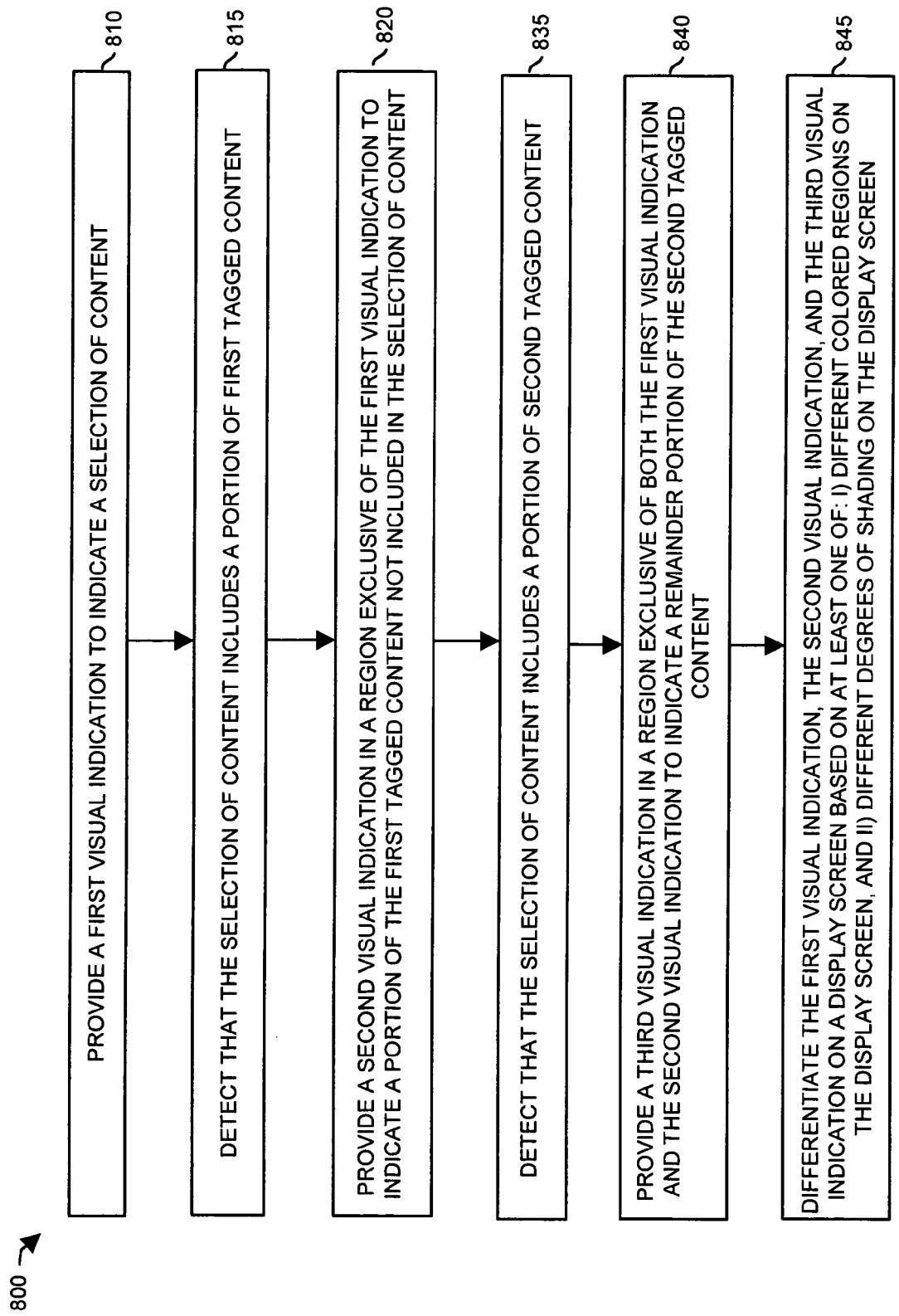
FIG. 8 is a flowchart illustrating techniques associated with an editor application according to an embodiment herein.

FIG. 8 is a flowchart 800 illustrating a technique of providing one or more respective indications to a user that a group of selected text includes partial selections of two or more sets of tagged content according to an embodiment herein and as discussed with respect to FIGS. 2 and 3 above.

In step 810, editor 105 provides a first visual indication to indicate a selection of content.

In step 815, editor 105 detects that the selection of content includes a portion of first tagged content.

In step 820, editor 105 provides a second visual indication in a region exclusive of the first visual indication to indicate a portion of the first tagged content not included in the selection of content.

In step 825, editor 105 detects that the selection of content includes a portion of second tagged content.

In step 830, editor 105 provides a third visual indication in a region exclusive of both the first visual indication and the second visual indication to indicate a remainder portion of the second tagged content.

In step 835, editor 105 provides a differentiation of the first visual indication, the second visual indication, and the third visual indication on a display screen based on at least one of: i) different colored regions on the display screen, and ii) different degrees of shading on the display screen. Accordingly, a user can identify different regions of text merely by color, shading, grouping, etc.

In one embodiment, steps 815 and 825 include searching for boundary markers associated with a user's original selection of text. For example, the editor 105 searches the selection of text to identify whether each of the first tagged content and the second tagged content are entirely encompassed by the selection of content. As discussed, the editor 105 identifies whether a whole set of tagged content has been selected based on whether both a respective "begin" tag and an "end" tag associated with a corresponding set of tagged content both reside within a user's original selection of text.

Note again that techniques herein are well suited for use in applications such as XML-based editor and display applications. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method for displaying information, the computer-implemented method comprising:
   providing a first visual indication to indicate a selection of tagged content;
   detecting that the selection of content includes part of a grouping of related tagged content; and
   providing a second visual indication to indicate a portion of the grouping of related tagged content not included in the selection of content;
   displaying a first type of command that can be performed on the selection of tagged content as identified by the first visual indication; and
   displaying a second type of command that can be performed on the portion the grouping of related tagged content as particularly identified by the second visual indication.

2. A computer-implemented method as in claim 1, wherein providing the second visual indication includes displaying the second visual indication in a region exclusive of a corresponding region occupied by the first visual indication, the computer-implemented method further comprising:
   identifying the selection of content based on monitoring movement of a pointer in a viewing region of a display screen.

3. A computer-implemented method as in claim 2, wherein detecting that the selection of content includes part of the grouping of related content includes:
   checking whether the selection of content includes selection of only one of at least two markers representing corresponding boundaries associated with the grouping of related content, selection of only the one marker indicating that at least a portion of but not all of the grouping of related content resides within the selection of content.

4. A computer-implemented method as in claim 1, wherein detecting that the selection of content includes part of the grouping of related content includes:
   detecting that the selection of content includes a first marker associated with a first boundary of the grouping of related content, inclusion of the first marker in the selection of content indicating that at least a portion of the grouping of related content resides within the selection of content; and detecting that the selection of content does not include a second marker associated with the grouping of related content, the second marker representing a second boundary associated with the grouping of related content, exclusion of the second marker from the selection of content indicating that an entirety of the grouping of related content does not reside within the selection of content.

5. A computer-implemented method as in claim 1, wherein providing the first visual indication includes shading at least part of a region occupied by the selection of content with a first type of visual cue; and wherein providing the second visual indication includes shading at least part of a region occupied by the grouping of related content not included in the selection of content with a second type of visual cue.

6. A computer-implemented method as in claim 5, wherein the first visual cue enables a user to identify a selection of text displayed on a display screen, the second visual cue enabling the user to identify a remainder portion of tagged content not included in the selection of text, the second visual cue indicating that the remainder portion of the tagged content is associated with at least a portion of the selection of text indicated by the first visual cue.

7. A computer-implemented method as in claim 1, wherein providing the second visual indication occurs in response to detecting movement of a selection pointer in relation to one of: i) a starting boundary associated with the grouping of related content, and ii) an ending boundary associated with the grouping of related content, the selection pointer identifying a region on a display screen defining the selection of content.

8. A computer-implemented method as in claim 1, wherein displaying the first type of command includes displaying at least one text editor command enabling a user to perform at least one respective text editing function associated with the selection of content identified by the first visual indication; and wherein displaying the second type of command includes displaying at least one tag command enabling the user to perform at least one respective tag operation on the grouping of related content, the at least one respective tag operation enabling the user to select a format associated with the grouping of related content.

9. A computer-implemented method as in claim 8 further comprising:
in an editor displaying the selection of text and the grouping of related content, providing an indication that i) the at least one text editor command can be performed on the selection of content identified by the first visual indication, and ii) the at least one tag command can be performed on the grouping of related content, the grouping of content being tagged content in an XML (extensible Markup Language) document displayed on the display screen.

10. A computer-implemented method as in claim 1, wherein the grouping of related content is a first grouping of related content, the computer-implemented method further comprising:
detecting that the selection of content includes part of a second grouping of related content; and
providing a third visual indication exclusive of the first visual indication and the second visual indication to indicate a portion of the second grouping of related content is exclusive of the selection of content.

11. A computer-implemented method as in claim 1, wherein detecting that the selection of content includes part of a grouping of related content involves detecting that the selection of content includes a portion of first tagged content and wherein providing the second visual indication involves providing the second visual indication in a region exclusive of the first visual indication to indicate a portion of the first tagged content not included in the selection of content, the computer-implemented method further comprising:
detecting that the selection of content includes a portion of second tagged content; and
providing a third visual indication in a region exclusive of both the first visual indication and the second visual indication to indicate a remainder portion of the second tagged content.

12. A computer-implemented method as in claim 11 further comprising:
differentiating the first visual indication, the second visual indication, and the third visual indication on a display screen based on at least one of: i) different colored regions on the display screen, and ii) different degrees of shading on the display screen.

13. A computer-implemented method as in claim 11 further comprising:
utilizing boundary markers associated with the first tagged content and the second tagged content i) to identify that each of the first tagged content and the second tagged content is not entirely encompassed by the selection of content and ii) to display the first visual indication, the second visual indication, and the third visual indication.

14. A computer program product including a computer-readable storage medium having instructions stored thereon for processing data information, such that the instructions, when carried out by a processing device, enable the processing device to perform the operations of:
providing a first visual indication on a display screen to indicate a selection of content;
detecting that the selection of tagged content includes part of a grouping of related tagged content; and
providing a second visual indication on the display screen to indicate a portion of the grouping of related tagged content not included in the selection of content;
displaying a first type of command that can be performed on the selection of tagged content as identified by the first visual indication; and
displaying a second type of command that can be performed on the portion the grouping of related tagged content as particularly identified by the second visual indication.

15. A computer program product as in claim 14, wherein providing the second visual indication includes displaying the second visual indication in a region exclusive of a corresponding region occupied by the first visual indication, the computer program product further supporting operations of:
identifying the selection of content based on monitoring movement of a pointer in a viewing region of the display screen.

16. A computer program product as in claim 15, wherein detecting that the selection of content includes part of the grouping of related content includes:
checking whether the selection of content includes selection of only one of at least two markers representing corresponding boundaries associated with the grouping of related content, selection of only the one marker indicating that at least a portion of but not all of the grouping of related content resides within the selection of content.

17. A computer program product as in claim 14, wherein providing the first visual indication includes shading at least part of a region occupied by the selection of content with a first type of visual cue; and wherein providing the second visual indication includes shading at least part of a region occupied by the grouping of related content not included in the selection of content with a second type of visual cue, the first type of visual cue enabling a user to identify a selection of text displayed by an editor on the display screen, the second type of visual cue enabling the user to identify a remainder portion of tagged content not included in the selection of text.

18. A computer program product as in claim 14, wherein displaying the first type of command includes displaying at least one text editor command enabling a user to perform at least one respective text editing function associated with the selection of content identified by the first visual indication; and wherein displaying the second type of command includes displaying at least one tag command enabling the user to perform at least one respective tag operation on the grouping of related content, the at least one respective tag operation enabling the user to select how to a format associated with the grouping of related content.

19. A computer program product as in claim 14, wherein detecting that the selection of content includes part of a grouping of related content involves detecting that the selection of content includes a portion of first tagged content and wherein providing the second visual indication involves providing the second visual indication in a region exclusive of the first visual indication to indicate a portion of the first tagged content not included in the selection of content, the computer program product further supporting operations of:
   detecting that the selection of content includes a portion of second tagged content;
   providing a third visual indication in a region exclusive of both the first visual indication and the second visual indication to indicate a remainder portion of the second tagged content; and
   differentiating the first visual indication, the second visual indication, and the third visual indication on the display screen based on at least one of: i) different colored regions on the display screen, and ii) different degrees of shading on the display screen.

20. A computer program product as in claim 19 further supporting operations of:
   utilizing boundary markers associated with the first tagged content and the second tagged content i) to identify that each of the first tagged content and the second tagged content is not entirely encompassed by the selection of content, and ii) to display the first visual indication, the second visual indication, and the third visual indication.

21. A computer system for displaying information, the computer system comprising:
   a processor;
   a memory unit that stores instructions associated with an application executed by the processor; and
   an interconnect coupling the processor and the memory unit, enabling the computer system to execute the application and perform operations of:
      providing a first visual indication on a display screen to indicate a selection of content;
      detecting that the selection of tagged content includes part of a grouping of related tagged content; and
      providing a second visual indication on the display screen to indicate a portion of the grouping of related tagged content not included in the selection of content;
      displaying a first type of command that can be performed on the selection of tagged content as identified by the first visual indication; and
      displaying a second type of command that can be performed on the portion the grouping of related tagged content as particularly identified by the second visual indication.

22. A computer system as in claim 21, wherein providing the second visual indication includes displaying the second visual indication in a region exclusive of a corresponding region occupied by the first visual indication; and
   wherein detecting that the selection of content includes part of the grouping of related content includes checking whether the selection of content includes selection of only one of at least two markers representing corresponding boundaries associated with the grouping of related content, selection of only the one marker indicating that at least a portion of but not all of the grouping of related content resides within the selection of content, the computer system further supporting operations of:
   identifying the selection of content based on monitoring movement of a pointer in a viewing region of the display screen.

23. A computer system as in claim 21, wherein providing the first visual indication includes shading at least part of a region occupied by the selection of content with a first type of visual cue; and wherein providing the second visual indication includes shading at least part of a region occupied by the grouping of related content not included in the selection of content with a second type of visual cue, the first type of visual cue enabling a user to identify a selection of text displayed by an editor on the display screen, the second type of visual cue enabling the user to identify a remainder portion of tagged content not included in the selection of text.

24. A computer system as in claim 23, wherein displaying the first type of command includes displaying at least one text editor command enabling a user to perform at least one respective text editing function associated with the selection of content identified by the first visual indication; and wherein displaying the second type of command includes displaying at least one tag command enabling the user to perform at least one respective tag operation on the grouping of related content, the at least one respective tag operation enabling the user to select a format associated with the grouping of related content.

25. A computer system as in claim 21, wherein detecting that the selection of content includes part of a grouping of related content involves detecting that the selection of content includes a portion of first tagged content and wherein providing the second visual indication involves providing the second visual indication in a region exclusive of the first visual indication to indicate a portion of the first tagged content not included in the selection of content, the computer system further supporting operations of:
   detecting that the selection of content includes a portion of second tagged content;
   providing a third visual indication in a region exclusive of both the first visual indication and the second visual indication to indicate a remainder portion of the second tagged content; and
   differentiating the first visual indication, the second visual indication, and the third visual indication on the display screen based on at least one of: i) different colored regions on the display screen, and ii) different degrees of shading on the display screen.

26. A computer system as in claim 25 further supporting operations of:
   utilizing boundary markers associated with the first tagged content and the second tagged content i) to identify that each of the first tagged content and the second tagged content is not entirely encompassed by the selection of content and ii) to display the first visual indication, the second visual indication, and the third visual indication.

27. A computer-implemented method as in claim 3, wherein the markers identify tags associated tagged content, a portion of which is included in the selection of content.

28. The computer-implemented method as in claim 1, wherein providing the first visual indication includes initiating display of a first visual cue encompassing the selection of content; and wherein providing the second visual indication includes initiating display of a second visual cue to indicate the grouping of related content, a first portion of the grouping of related content located inside the first visual cue, a second portion of the grouping of related content located outside the first visual cue but being located inside the second visual cue.

29. The computer-implemented method as in claim 28 further comprising:

initiating display of at least one command for applying to content encompassed by the first visual cue; and initiating display of at least one command for applying to content encompassed by the second visual cue.

30. The computer-implemented method as in claim 1, wherein the selection of content as specified by the first visual indication includes a portion of tagged content, the second visual indication indicating a portion of the tagged content outside a boundary of the first visual indication.

* * * * *

UNITED STATES PATENT AND TRADEMARK OFFICE
CERTIFICATE OF CORRECTION

PATENT NO. : 7,574,675 B1  
APPLICATION NO. : 11/152389  
DATED : August 11, 2009  
INVENTOR(S) : Linker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Fourteenth Day of December, 2010

David J. Kappos  
*Director of the United States Patent and Trademark Office*